United States Patent
Chung et al.

(10) Patent No.: US 6,699,642 B2
(45) Date of Patent: Mar. 2, 2004

(54) METHOD OF MANUFACTURING TRIODE CARBON NANOTUBE FIELD EMITTER ARRAY

(75) Inventors: Deuk-seok Chung, Kyungki-do (KR); Jong-min Kim, Kyungki-do (KR); Shang-hyeun Park, Chungcheongnam-do (KR); Nae-sung Lee, Seoul (KR); Hang-woo Lee, Kyungki-do (KR)

(73) Assignee: Samsung SDI Co., Ltd. (KR)

( * ) Notice: Subject to any disclaimer, the term of this patent is extended or adjusted under 35 U.S.C. 154(b) by 135 days.

(21) Appl. No.: 10/035,438

(22) Filed: Jan. 4, 2002

(65) Prior Publication Data

US 2002/0094494 A1 Jul. 18, 2002

(30) Foreign Application Priority Data

Jan. 5, 2001 (KR) .............................. 2001-680
Dec. 22, 2001 (KR) ........................ 2001-83353

(51) Int. Cl.⁷ ................................. G03F 7/26
(52) U.S. Cl. ...................... 430/313; 311/320
(58) Field of Search ............... 430/320, 311, 430/313; 313/309, 311

(56) References Cited

U.S. PATENT DOCUMENTS

| | | | | |
|---|---|---|---|---|
| 5,973,444 A | | 10/1999 | Xu et al. ............... | 313/309 |
| 6,097,138 A | | 8/2000 | Nakamoto ............. | 313/309 |
| 6,486,599 B2 | * | 11/2002 | Wang .................... | 313/495 |
| 2001/0025962 A1 | | 10/2001 | Nakamoto ............. | 257/137 |

FOREIGN PATENT DOCUMENTS

JP     A-2000-348601     12/2000
JP     A-2001-143601     5/2001

OTHER PUBLICATIONS

D. S. Chung, et al., *Field emission display using self–aligned carbon nanotube field emitters*, Proceedings of the 14th International Vacuum Microelectronics Conference, Aug. 2001, pp. 179–180, Piscataway, NJ.

W. B. Choi, et al., *Late–News Paper: A 4.5–in. Fully Sealed Carbon Nanotube–Based Field–Emission Flat–Panel Display*, SID Digest, vol. 30, May 1999, pp. 1134–1137, San Jose, CA.

* cited by examiner

*Primary Examiner*—Kathleen Duda
(74) *Attorney, Agent, or Firm*—Burns, Doane, Swecker & Mathis, LLP (57) ABSTRACT

A method of manufacturing a field emitter array using carbon nanotubes, low voltage field emission material, is provided. The method includes the steps of (a) forming a conductive thin film layer on the top of a transparent substrate having a transparent electrode and exposing a predetermined portion of the transparent electrode; (b) forming an opaque thin film layer on the exposed predetermined portion of the transparent electrode; (c) depositing an insulation material on the entire top surface of the transparent substrate and removing the insulation material from the top surfaces of the conductive thin film layer and the opaque thin film layer, thereby forming an insulation layer; (d) forming a gate layer on the top of the insulation layer; and (e) removing the opaque thin film layer and forming carbon nanotube tips on the top of the exposed transparent electrode. Accordingly, the triode carbon nanotube field emitter array can be easily manufactured using a small number of mask layers and without using a special aligner.

21 Claims, 14 Drawing Sheets

METHOD OF MANUFACTURING TRIODE CARBON NANOTUBE FIELD EMITTER ARRAY

Priority is claimed to Patent Application Numbers 2001-680, filed in the Republic of Korea on Jan. 5, 2001 and 2001-83353 filed Dec. 22, 2001, herein incorporated by reference.

BACKGROUND OF THE INVENTION

1. Field of the Invention

The present invention relates to a method of manufacturing a field emitter array using low voltage field emission material, carbon nanotubes.

2. Description of the Related Art

Conventionally, Spindt type field emitter arrays (FEAs) formed of a metal such as Mo or a semiconductor material such as Si are used for field emission displays (FEDs). These are micro tip FEDs employing a method of emitting electrons from tips by applying a strong electric field from a gate to the tips arranged at regular intervals. Micro tip FEDs require expensive semiconductor equipment and are disadvantageous in manufacturing FEDs having a large area.

In the case of a tip formed of a metal or semiconductor, a work function is large, so gate voltage for electron emission is relatively very high. Accordingly, during emission of electrons, residual gas particles in a vacuum collide with electrons to be ionized, and these gas ions collide with micro tips shocking them, thereby breaking an electron emission source. In addition, electrons collide with a phosphor layer knocking out phosphor particles which then contaminate micro tips, which decreases the performance of an electron emission source and finally decreases the performance and life of an FEA.

Recently, as carbon nanotubes are introduced as a new field emission material, research into replacing metal tips used as electron emission tips with carbon nanotubes has been conducted. Carbon nanotubes have a large aspect ratio, excellent electrical conductivity, and stable mechanical characteristics. Due to these characteristics, many research organizations are trying to develop ways to manufacture better field emission devices using carbon nanotubes as a field emission material. Such carbon nanotubes require a very low electron emission field of only about 2 V/$\mu$m and have excellent chemical stability, so they are suitable for manufacturing field emission displays.

Diode field emission devices using carbon nanotubes can be easily manufactured in a conventional typical structure. However, they are disadvantageous in controlling emission current and realizing a moving picture or gray-scale picture. Accordingly, instead of a diode structure, a triode structure is required. In patents relating to field emission displays using carbon nanotubes, like U.S. Pat. No. 5,973,444 issued to Xu et al., a triode structure and micro tip is formed by a thin film process throughout manufacturing, based on growing carbon nanotubes using a chemical vapor deposition (CVD) method. When a triode structure is manufactured in this way, expensive semiconductor equipment is required, and it is difficult to manufacture displays having a large area.

When an existing thick film process is used, it is difficult to form a typical triode structure due to a limitation of the thick film process in resolution. Moreover, when manufacturing large-area displays, a high temperature annealing process attendant upon the characteristics of a thick film makes it difficult to align layers during formation of a multi-layer.

SUMMARY OF THE INVENTION

To solve the above-described problems, it is an object of the present invention to provide a method of manufacturing a carbon nanotube field emitter array, in which blanket deposition of a photosensitive thick film material using screen printing and an etching process are used for forming a triode structure, but a small number of mask layers are used, and through which an alignment problem among layers in a multi-layer is overcome.

To achieve the above object of the invention, in one aspect, there is provided a method of manufacturing a triode carbon nanotube field emitter array. The method includes the steps of (a) forming a conductive thin film layer on the top of a transparent substrate having a transparent electrode and exposing a predetermined portion of the transparent electrode; (b) forming an opaque thin film layer on the exposed predetermined portion of the transparent electrode; (c) depositing an insulation material on the entire top surface of the transparent substrate and removing the insulation material from the top surfaces of the conductive thin film layer and the opaque thin film layer, thereby forming an insulation layer; (d) forming a gate layer on the top of the insulation-layer; and (e) removing the opaque thin film layer and forming carbon nanotube tips on the top of the exposed transparent electrode.

Preferably, the step (a) includes the sub steps of patterning a transparent electrode layer on the transparent substrate, thereby forming the transparent electrode in a striped pattern; forming the conductive thin film layer on the top of the patterned transparent electrode; and forming a hole at a predetermined portion of the conductive thin film layer, thereby exposing the transparent electrode. Alternatively, the step (a) includes the sub steps of forming the conductive thin film layer on the top of the transparent substrate having a transparent electrode layer; patterning the conductive thin film layer and the transparent electrode layer simultaneously in a striped pattern; and forming a hole at a predetermined portion of the conductive thin film layer, thereby exposing the transparent electrode layer.

Preferably, the step (c) is accomplished by performing reverse exposure processing on the transparent substrate after depositing the insulation material on the entire top surface of the transparent substrate.

Preferably, the step (c) forms the insulation layer by performing a cycle two times. The cycle includes the steps of depositing the insulation material on the entire top surface of the transparent substrate using a printing process and drying the resulting structure; removing the insulation material from the top of the conductive thin film layer and the top of the opaque thin film layer using reverse exposure and development processes; and firing the remaining insulation material.

Preferably, the step (d) includes the sub steps of forming an opaque insulation layer on the center portion of the insulation layer using a cathode gate patterned screen mask; depositing conductive photosensitive paste on the entire top surface of the transparent substrate; and performing a reverse exposure process on the transparent substrate, thereby forming the gate layer.

Preferably, the step (e) includes the sub steps of depositing negative photosensitive carbon nanotube paste on the entire top surface of the transparent substrate; and performing a reverse exposure on the transparent substrate, thereby forming the carbon nanotube tips only on the top of the transparent electrode.

Preferably, the conductive thin film layer includes Cr, and the opaque thin film layer includes Al. Preferably, the insulation layer and the gate layer are formed of negative photosensitive paste.

To achieve the above object of the invention, in another aspect, there is provided a method of manufacturing a triode carbon nanotube field emitter array. The method includes the steps of (a) forming a conductive thin film layer on the top of a transparent substrate having a transparent electrode and exposing a predetermined portion of the transparent electrode; (b) depositing an insulation material on the top of the transparent substrate; (c) forming and patterning a gate layer on the top of the insulation material, thereby exposing the insulation material on the top of the transparent electrode; (d) removing the insulation material from the top of the transparent electrode, thereby forming an insulation layer and exposing the conductive thin film layer and a predetermined portion of the transparent electrode; and (e) forming carbon nanotube tips on the top of the exposed transparent electrode.

Preferably, the step (c) includes the sub steps of depositing a conductive material on the top of the insulation material using thin film equipment; and patterning the conductive material at a location corresponding to the transparent electrode in a hole pattern, thereby exposing the insulation material and forming the gate layer.

Preferably, the step (d) is accomplished by performing a dry etching process on the top of the transparent substrate.

Preferably, the step (e) includes the sub steps of depositing negative photosensitive carbon nanotube paste on the entire top surface of the transparent substrate; and performing a reverse exposure on the transparent substrate, thereby forming the carbon nanotube tips only on the top of the transparent electrode.

Preferably, the method further includes the step of performing a PR process on the conductive material of the gate layer, thereby forming a line-shaped gate layer.

Preferably, the conductive thin film layer includes Cr, and the insulation material includes polyimide. Preferably, the insulation layer and the gate layer are formed of positive photosensitive paste.

To achieve the above object of the invention, in still another aspect, there is provided a method of manufacturing a triode carbon nanotube field emitter array. The method includes the steps of (a) sequentially forming an amorphous silicon layer and an insulation layer on a transparent substrate on which a transparent electrode is formed; (b) forming a conductive gate layer on the surface of the insulation layer and forming a hole in the gate layer and the insulation layer such that the amorphous silicon layer is exposed; (c) forming a hole in the exposed amorphous silicon layer, thereby exposing the transparent electrode, and depositing carbon nanotube paste on the entire surface of the transparent substrate having the gate layer and the hole; and (d) performing a development process by radiating ultraviolet rays at a back of the transparent substrate.

Preferably, the step (b) includes forming a hole in the gate layer using photolithography, thereby exposing the insulation layer; and putting the resultant structure in an oxide etchant, thereby forming a hole in the oxide layer such that the amorphous silicon layer is exposed.

Preferably, the step (c) includes performing dry-etching or wet-etching on the amorphous silicon layer, thereby forming a hole exposing the transparent electrode; line-patterning the gate layer using photolithography; and depositing carbon nanotube paste on the entire surface of the transparent substrate having the gate layer and the hole using screen printing.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

A first embodiment of a triode carbon nanotube field emitter array according to the present invention will be described with reference to FIGS. 1A through 1J. Here, an insulation layer and a gate layer of a conductive thick film are formed by a negative process.

Figure 1A:
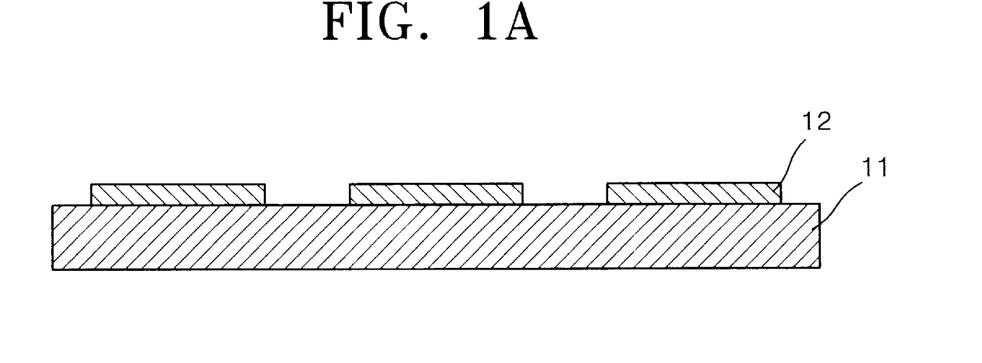
FIGS. 1A through 1J are sectional views of a method of manufacturing a triode carbon nanotube field emitter array according to a first embodiment of the present invention using a negative process.

In the present invention, a transparent substrate with a transparent electrode is used. For example, indium tin oxide (ITO) usually used is deposited on a glass substrate 11, and patterning is performed on the ITO, thereby forming an ITO electrode 12 in a striped pattern. FIG. 1A is a sectional view of the substrate, taken perpendicular to the stripes of the ITO electrode 12, after being subjected to a patterning process.

Figure 1B:
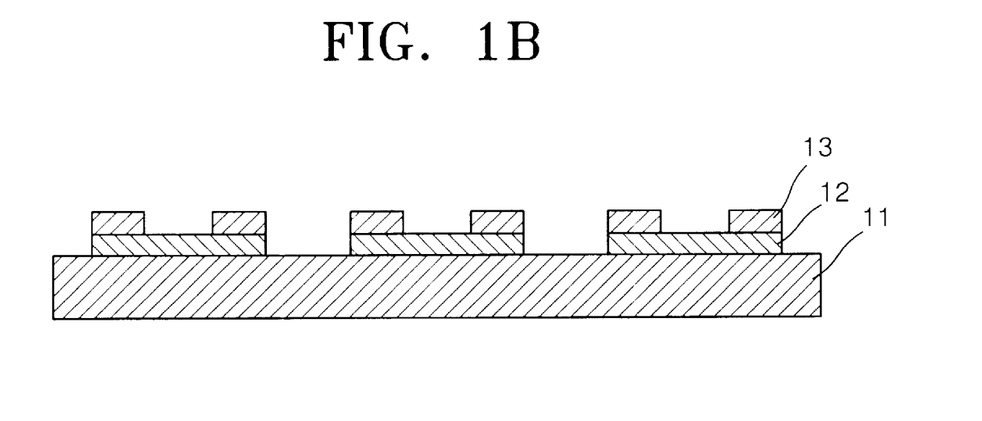

Next, a Cr thin film layer 13 is formed on the entire top surfaces of the glass substrate 11 and ITO electrode 12, using thin film equipment such as sputtering equipment. Exposure and development processes are performed on the Cr thin film layer 13, thereby patterning the Cr thin film layer 13, as shown in FIG. 1B. The shape of the Cr thin film layer 13 is not restricted, but it is preferable to form the Cr thin film layer 13 to have a hole at its center, as is shown in FIG. 1B, in order to grow carbon nanotubes in a following process.

Figure 1C:
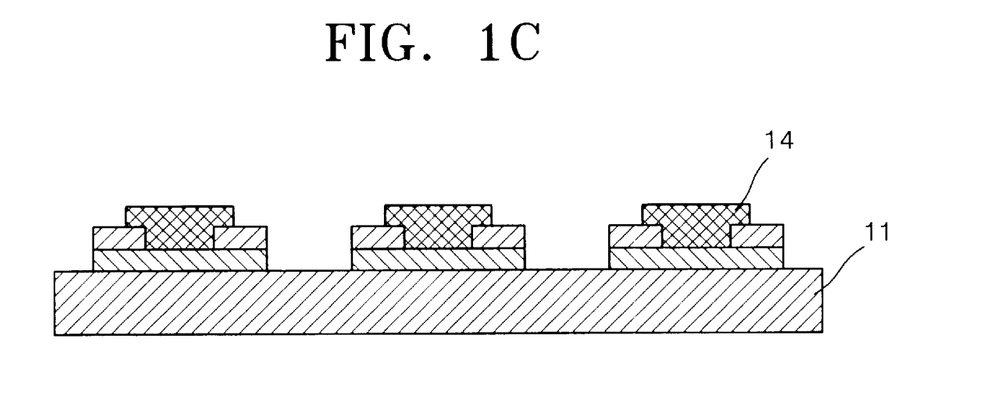

Subsequently, an Al thin film layer 14 is formed on the entire top surfaces of the glass substrate 11, ITO electrode 12 and Cr thin film layer 13 using thin film equipment such as sputtering equipment. Exposure and development processes are performed on the Al thin film layer 14, thereby patterning the Al thin film layer 14 in a dotted pattern partially extending over the ITO electrode 12 and Cr thin film layer 13, as shown in FIG. 1C. Here, the materials of the Cr thin film layer 13 and Al thin film layer 14 are not restricted to Cr and Al, respectively.

Figure 1D:
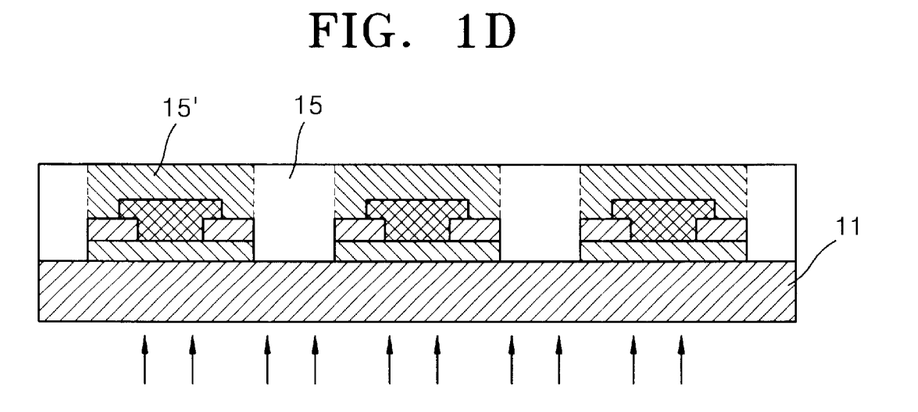

Thereafter, an insulation material formed using negative photosensitive paste is deposited by a screen printing process on the entire top surface of the glass substrate 11 having the Cr thin film layer 13 and Al thin film layer 14. After this process, ultraviolet rays used for a normal exposure process are radiated at the bottom surface of the glass substrate 11, as shown in FIG. 1D, for reverse exposure. During the reverse exposure, the previously formed Cr thin film layer 13 and Al thin film layer 14 act as mask layers because they are opaque. Accordingly, during the reverse exposure, radiated light can only pass through portions on which the Cr thin film layer 13 and Al thin film layer 14 are not formed.

Figure 1E:
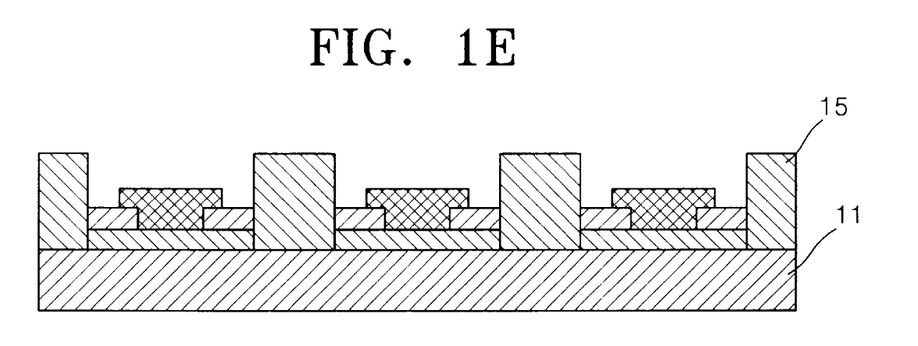

As shown in FIG. 1E, when a development process is performed after the reverse exposure, only an insulation layer 15 excluding an insulation layer 15', on a portion on which the Cr thin film layer 13 and Al thin film layer 14 acting as masks on the top of the glass substrate 11 are formed, remains. Here, the insulation layers 15' and 15 are formed of negative photosensitive paste. Typically, it is preferable to perform a Printing/Drying/Exposure & Development/Firing (P/D/E&D/F) process two times when forming a thick film insulation layer to have an excellent insulation characteristic considering a micro pin hole. Here, the insulation material, i.e., the negative photosensitive paste, has transmissivity of at least 70% with respect to ultraviolet rays (wavelength: about 350 nm) used during a typical exposure process, so ultraviolet rays can pass through the insulation material during an exposure process.

Figure 1F:
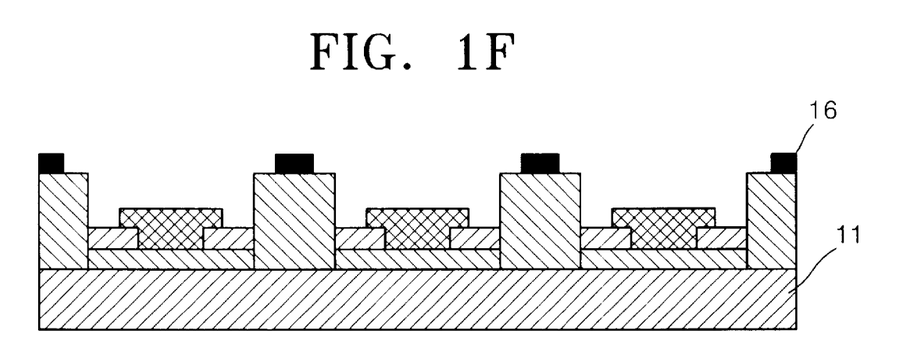
Figure 1G:
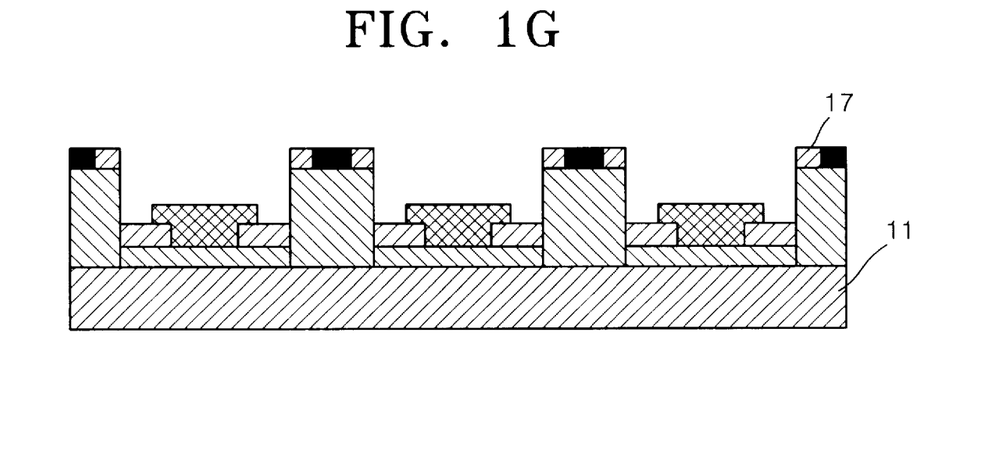

Thereafter, as shown in FIG. 1F, an opaque insulation layer 16 is printed on the top of the insulation layer 15 using a negative gate patterned screen mask. Subsequently, only a drying process is performed on the resulting structure, and conductive photosensitive paste is deposited by a screen printing process on the entire top surface of the glass substrate 11. Thereafter, an exposure process is performed on the bottom surface of the glass substrate 11, thereby forming a gate electrode layer 17, as shown in FIG. 1G.

Figure 1H:
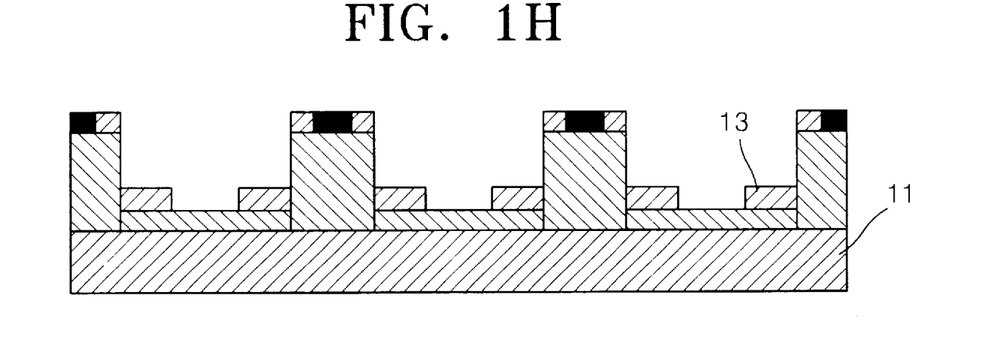

Thereafter, a firing process is performed on the resulting structure, and then the dot-patterned Al thin film layer 14 on the top of the ITO electrode 12 is removed using an Al etchant, thereby forming a hole at the center of the Cr thin film layer 13, as shown in FIG. 1H.

Figure 1I:
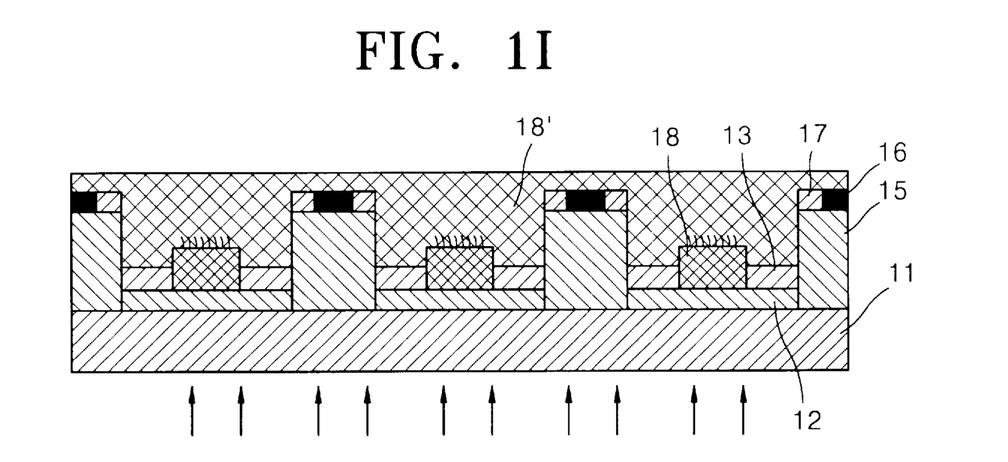
Figure 1J:
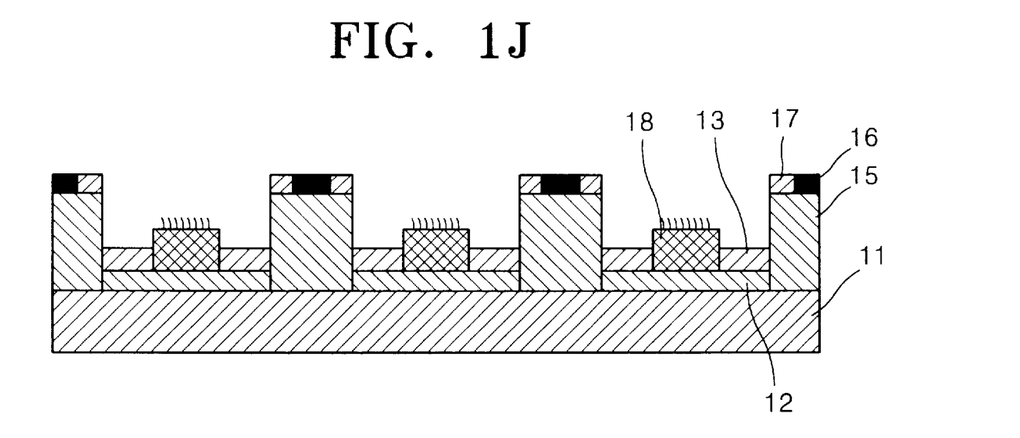

Finally, as shown in FIGS. 1I and 1J, photosensitive carbon nanotube paste is deposited on the top of the glass substrate 11 by a printing process, and then exposure and development processes are performed on the bottom surface of the glass substrate 11. Here, the carbon nanotube paste is preferably a negative photosensitive material. Then, reverse exposure is performed. As a result, only the photosensitive carbon nanotube paste deposited on the top of the ITO electrode 12 passing through an exposure beam remains, and the photosensitive carbon nanotube paste deposited on the tops of the Cr thin film layer 13 and gate electrode layer 17 is removed, thereby forming a carbon nanotube tip layer 18 in the hole within the ring-shaped Cr thin film layer 13.

In the above method, it is not necessary to separately form a photomask on the top of a substrate for forming a cathode because the Cr thin film layer 13 and Al thin film layer 14 act as a photomask. Accordingly, an aligner is not necessary in a following process. In addition, a multi-layer formed thereon is self-aligned. Consequently, an alignment error due to deformation of glass attendant upon a firing process necessary when forming each layer of the multi-layer, and an error due to an aligner used for alignment of each layer can be prevented. Therefore, the distance between the tip of a carbon nanotube and a gate can be narrowed, thereby greatly decreasing field emission voltage.

A second embodiment of the present invention will be described in detail with reference to FIGS. 2A through 2K which are sectional views of processes of manufacturing a triode carbon nanotube field emitter array using positive paste for an insulation material and conductive material.

Figure 2A:
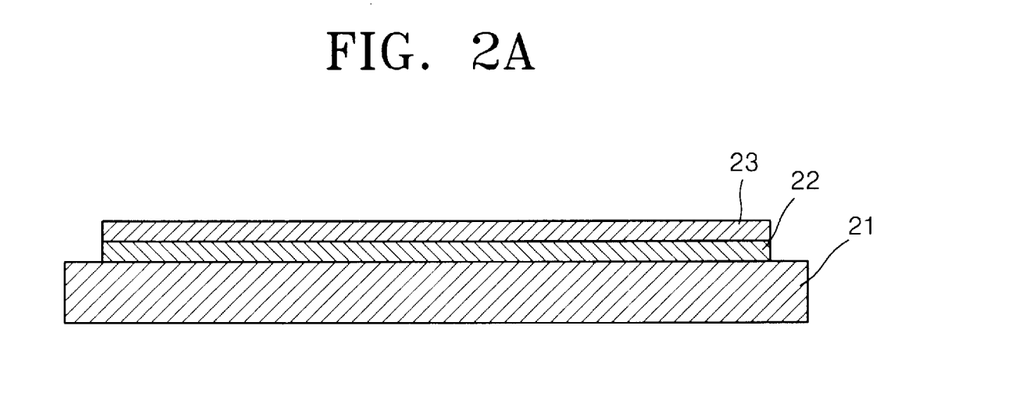
FIGS. 2A through 2k are sectional views of a method of manufacturing a triode carbon nanotube field emitter array according to a second embodiment of the present invention using a positive process.

As shown in FIG. 2A, a Cr thin film layer 23 is formed on the entire top surface of a glass substrate 21, on which ITO 22 typically used as a transparent electrode is deposited, using thin film equipment such as sputtering equipment.

Figure 2B:
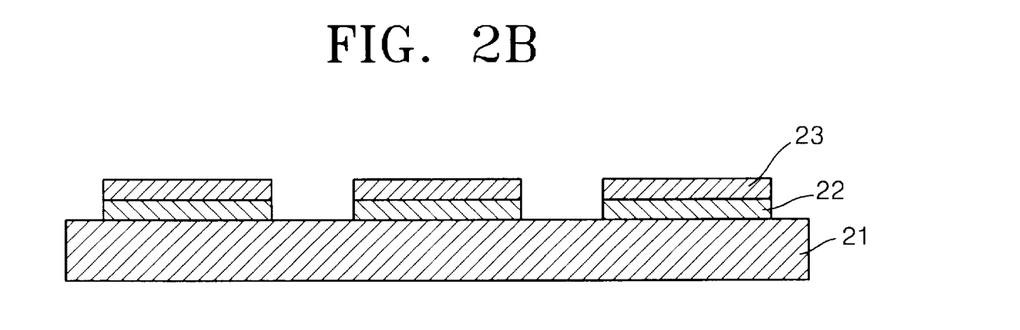
Figure 2C:
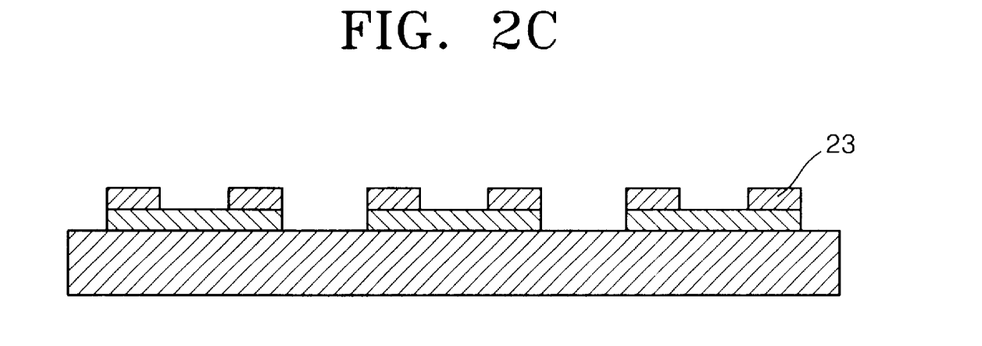

Exposure and development processes are performed on the Cr thin film layer 23, thereby forming a Cr electrode layer 23. As shown in FIGS. 2B and 2C, the Cr electrode layer 23 and the ITO electrode layer 22 are formed in a striped pattern, and then a hole is formed within the Cr electrode layer 23 so that the Cr electrode layer 23 has a ring shape. When an etching process is performed on the glass substrate 21 using an ITO etchant after forming the Cr electrode layer 23, the ITO electrode layer 22 on which the Cr electrode layer 23 does not exist is etched, as shown in FIG. 2B. As a result, the Cr electrode layer 23 and the ITO electrode layer 22 are aligned in the same pattern, thereby forming a cathode. Thereafter, as shown in FIG. 2C, exposure and development processes are performed on the Cr electrode layer 23, thereby forming a hole. The hole is an area in which carbon nanotubes are formed in a following process.

Figure 2D:
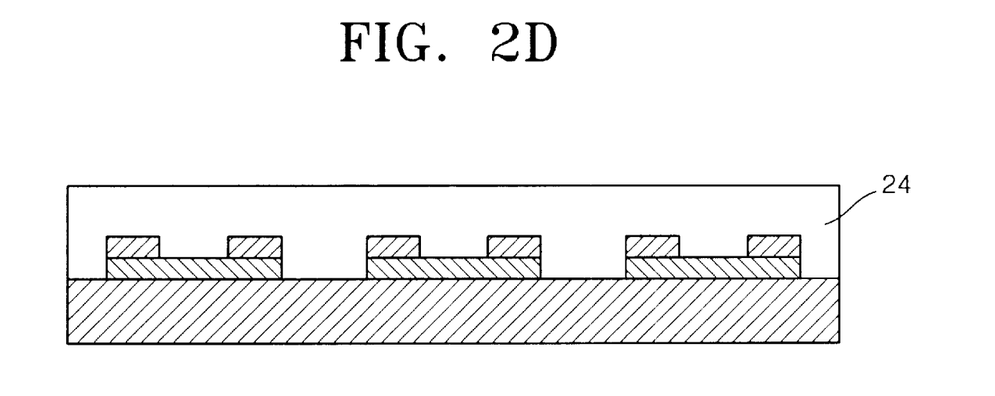

Next, as shown in FIG. 2D, an insulation material is deposited in the form of a thick film on the top of the glass substrate 21. It is preferable to use a material such as polyimide which has excellent insulation and temperature characteristics and facilitates formation of a thick film, as the insulation material. After depositing the insulation material on the entire top surfaces of the glass substrate 21 and Cr electrode layer 23 using a spin coating method, a curing process is performed thereon, thereby forming an insulation layer 24.

Figure 2E:
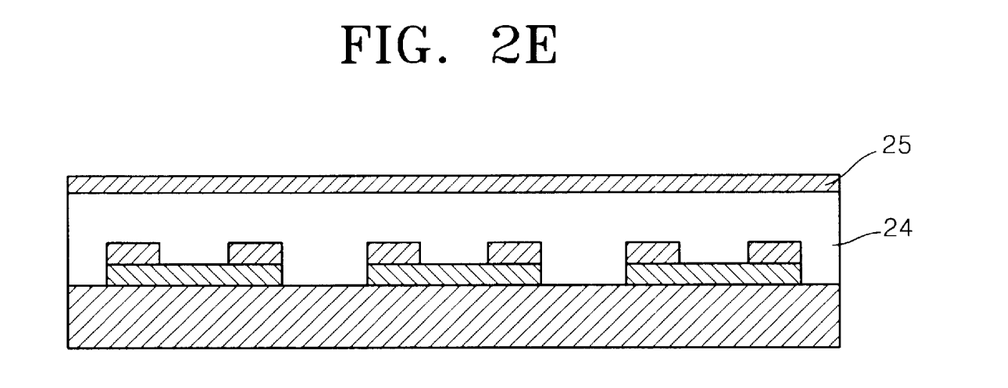
Figure 2F:
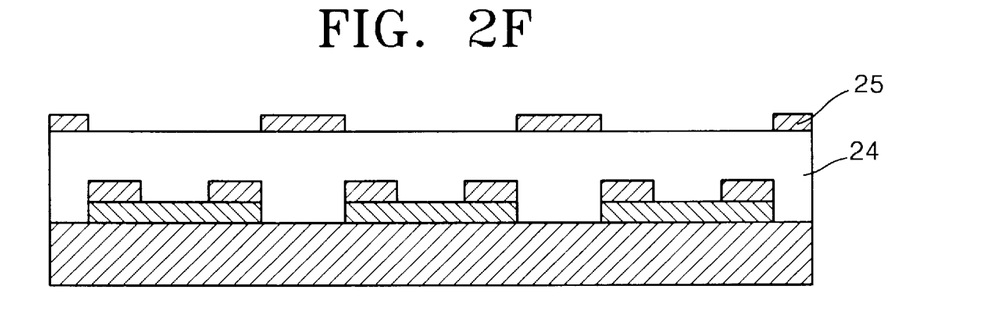
Figure 2G:
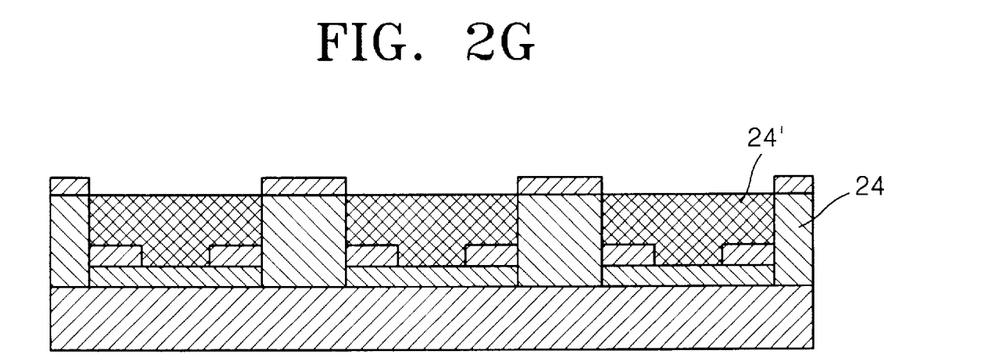

Next, as shown in FIG. 2E, a conductive material is deposited on the top of the insulation layer 24 using thin film equipment, thereby forming a conductive layer 25. As shown in FIG. 2F, the conductive layer 25 is patterned to form a gate layer 25. Here, the conductive layer 25 formed on the ITO electrode layer 22 is removed by the patterning, thereby preferably forming a hole. Accordingly, the remaining conductive layer 25 acts as the gate layer 25. Thereafter, as shown in FIG. 2G, a dry etching process is performed, thereby patterning the gate layer and removing an insulation material 24' in an exposed hole. Unlike the first embodiment in which the insulation material 15' is removed by an exposure process performed on the bottom of a substrate, a dry etching process is performed on the entire top surface of the substrate to remove the insulation material 24'.

Figure 2H:
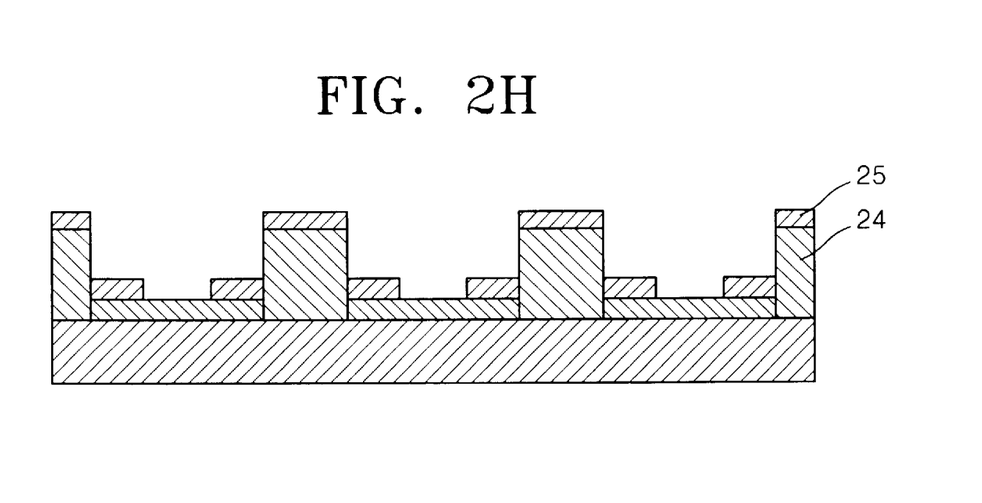
Figure 2I:
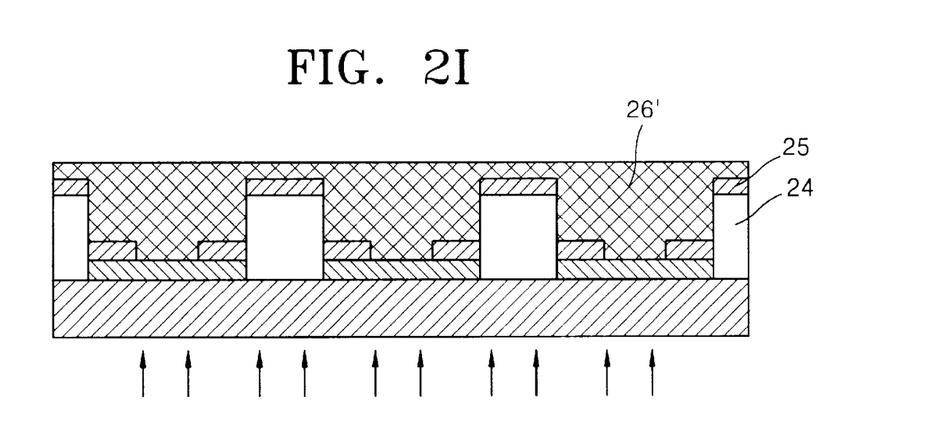
Figure 2J:
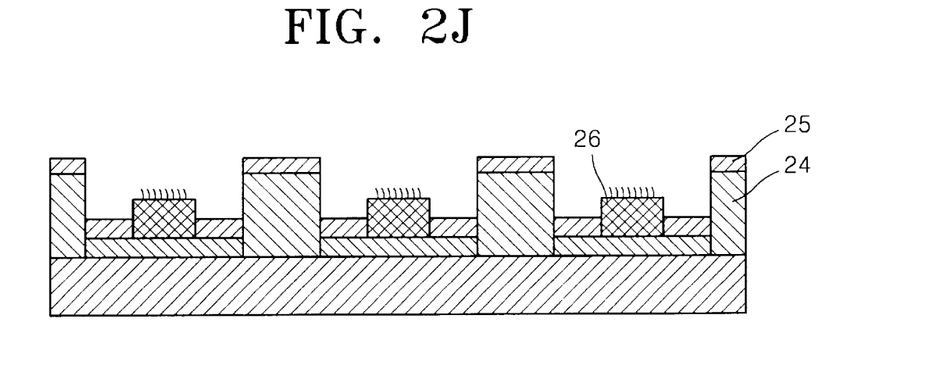
Figure 2K:
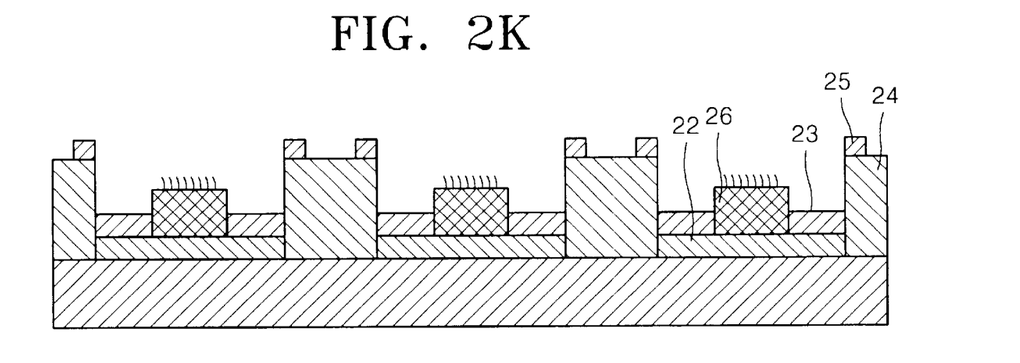

When the insulation material 24' is removed, the ITO electrode layer 22 is exposed in the hole of the Cr electrode 23, as shown in FIG. 2H. In this state, photosensitive carbon nanotube paste is deposited on the top of the glass substrate 21 by a screen printing process, and exposure and development processes are performed on the bottom of the glass substrate 21, as shown in FIG. 2I. Here, like the first embodiment, it is preferable that the carbon nanotube paste is a negative photosensitive paste. As a result, a carbon nanotube tip layer 26 is formed in the hole of the Cr electrode layer 23, as shown in FIG. 2J. Finally, a typical PR process is performed on the gate layer 25, thereby forming a line-shaped gate layer 25, as shown in FIG. 2K.

As compared to a case of using a negative photosensitive insulation material and a negative photosensitive conductive material, in a case of using a positive photosensitive insulation material and a positive photosensitive conductive material, the hole of a gate layer and the hole of an insulation layer should be particularly aligned, but the tips of carbon nanotubes are self-aligned, and the other processes are simpler.

A third embodiment of the present invention will be described in detail with reference to FIGS. 3A through 3J.

FIGS. 3A through 3J are sectional views of steps of manufacturing a triode carbon nanotube field emitter array using the optical characteristics of an amorphous silicon layer used as a resistance layer in a field emission display device.

Figure 3A:
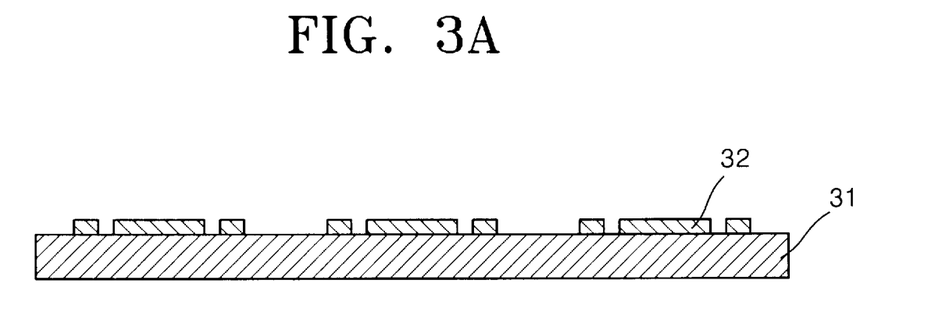
FIGS. 3A through 3J are sectional views of a method of manufacturing a triode carbon nanotube field emitter array according to a third embodiment of the present invention using a positive process.

As shown in FIG. 3A, a material for a transparent electrode 32 is deposited on the surface of a transparent substrate 31. A glass substrate can be used for the transparent substrate 31. The material for the transparent electrode 32 may be ITO. The transparent electrode 32 is formed in a striped pattern by photolithography.

Figure 3B:
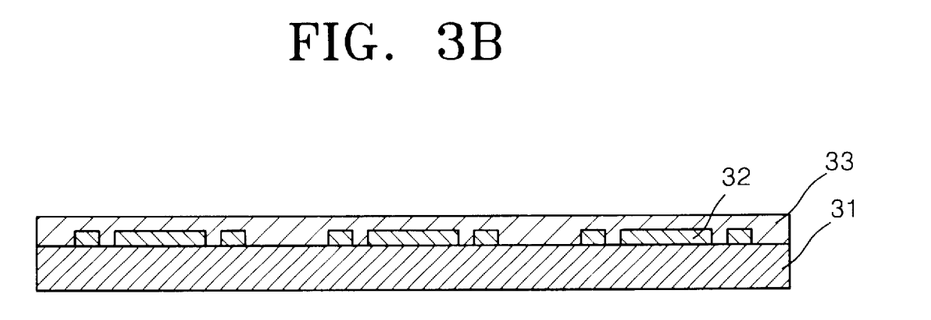
Figure 3C:
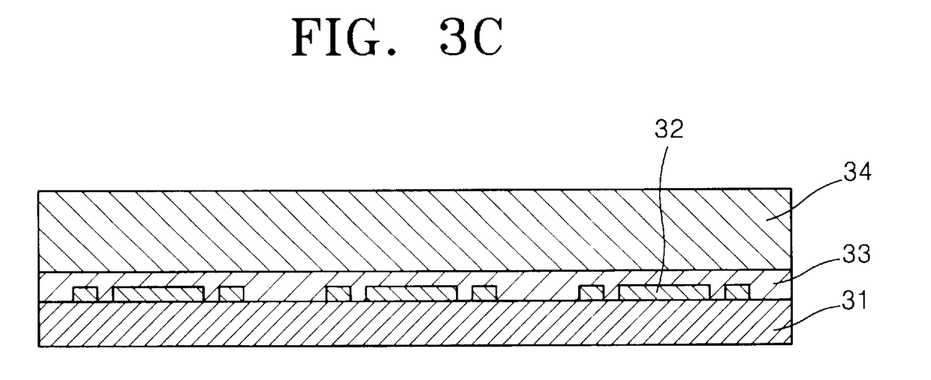
Figure 3D:
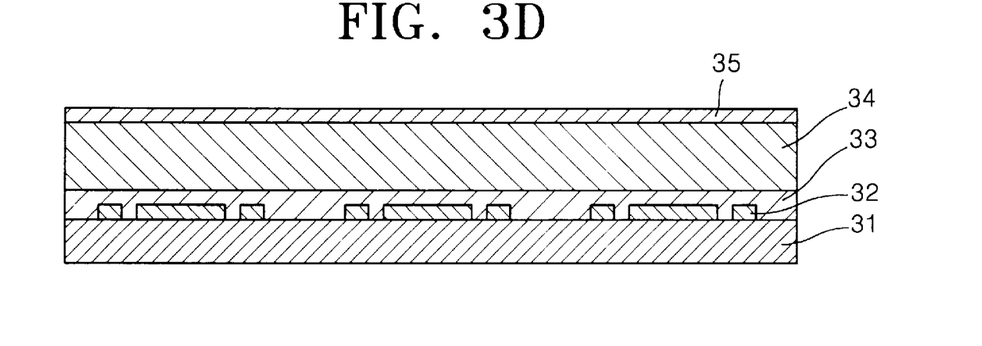
Figure 3E:
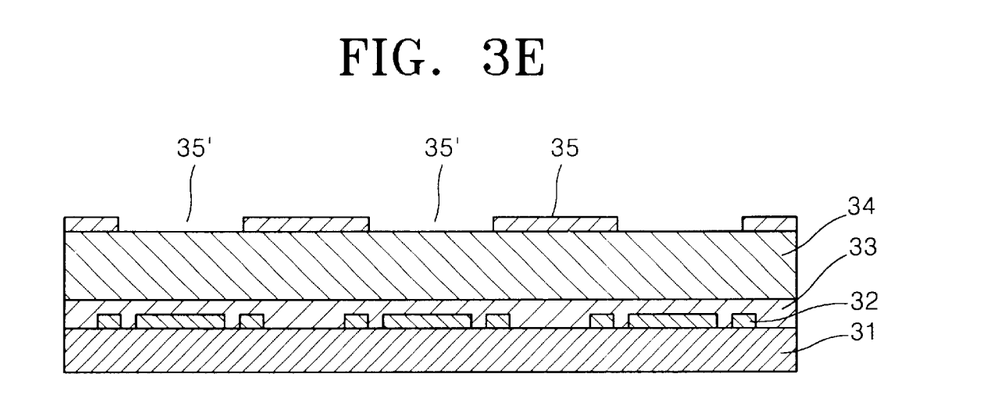
Figure 3F:
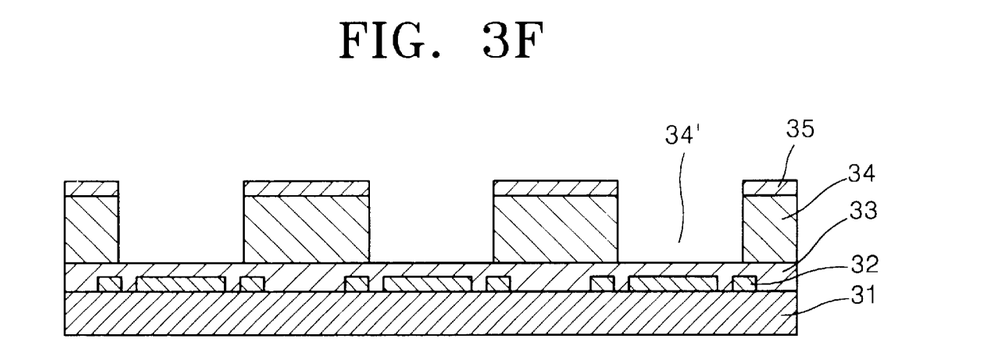
Figure 3G:
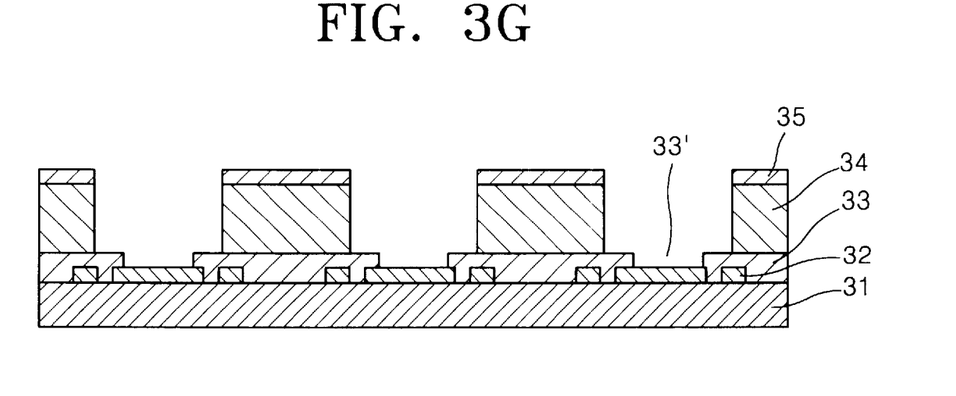
Figure 3H:
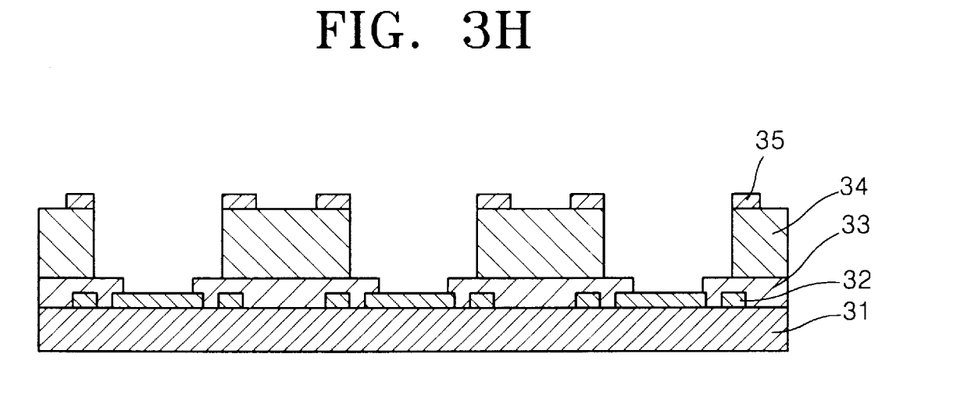

Next, as shown in FIG. 3B, an amorphous silicon layer 33 is formed on the surface of the transparent substrate 31 and the surface of the transparent electrode 32 using, for example, a plasma enhanced chemical vapor deposition (PECVD) apparatus. Then, as shown in FIG. 3C, an oxide layer 34 used as an insulation layer is formed on the surface of the amorphous silicon layer 33 in-situ. After forming the oxide layer 34, as shown in FIG. 3D, a conductive gate layer 35 is formed by depositing, for example, Cr on the surface of the oxide layer 34 using a thin film apparatus. Next, as shown in FIG. 3E, a hole 35' is formed in the gate layer 35 by photolithography. The hole is formed at a position corresponding to the transparent electrode 32. Next, the resultant structure is put in an oxide etchant, thereby forming a hole 34' in the oxide layer 34 such that the amorphous silicon layer 33 is exposed, as shown in FIG. 3F. Dry-etching or wet-etching is performed on the exposed amorphous silicon layer 33, thereby forming a hole 33' exposing the transparent electrode 32, as shown in FIG. 3G. Next, photolithography is performed on the gate layer 35 formed on the oxide layer 34, thereby line-patterning the gate layer 35, as shown in FIG. 3H.

Figure 3I:
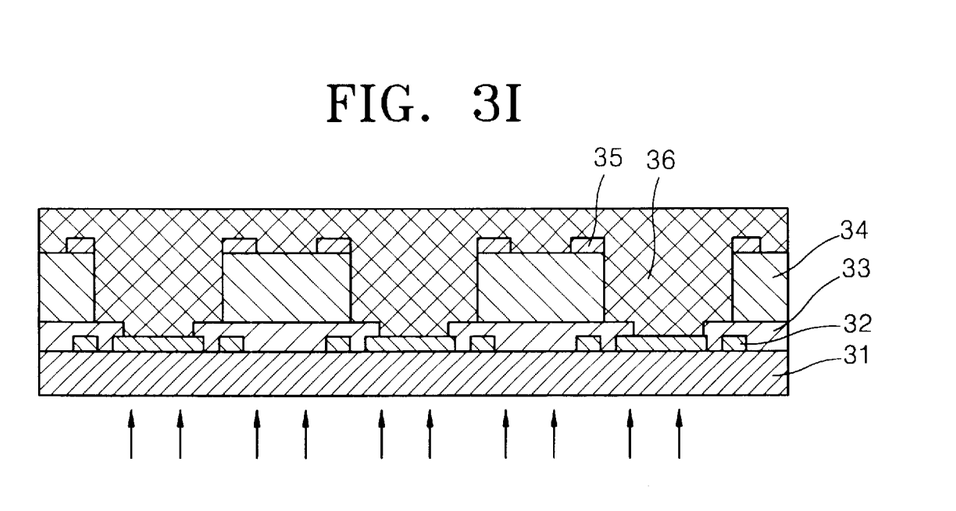
Figure 3J:
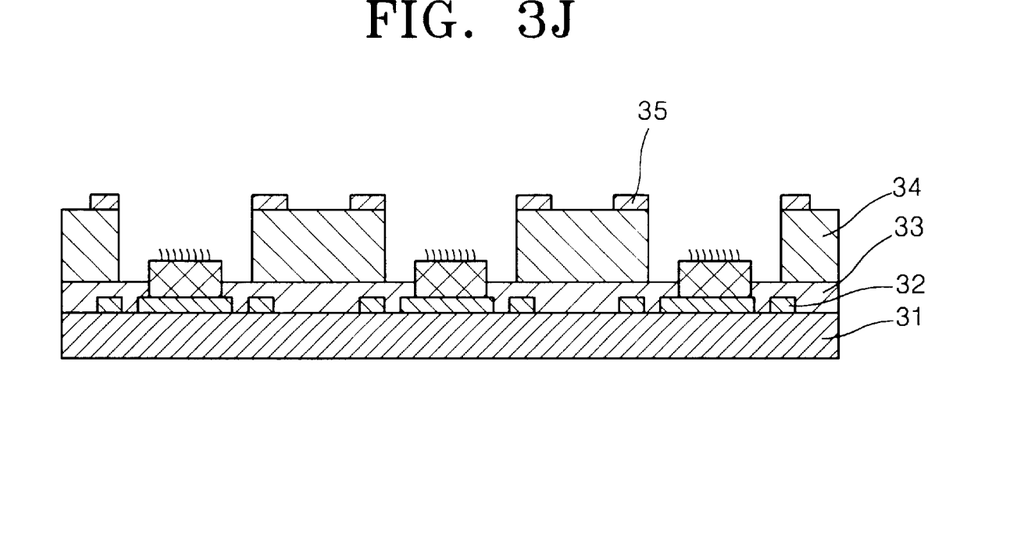
Figure 4:
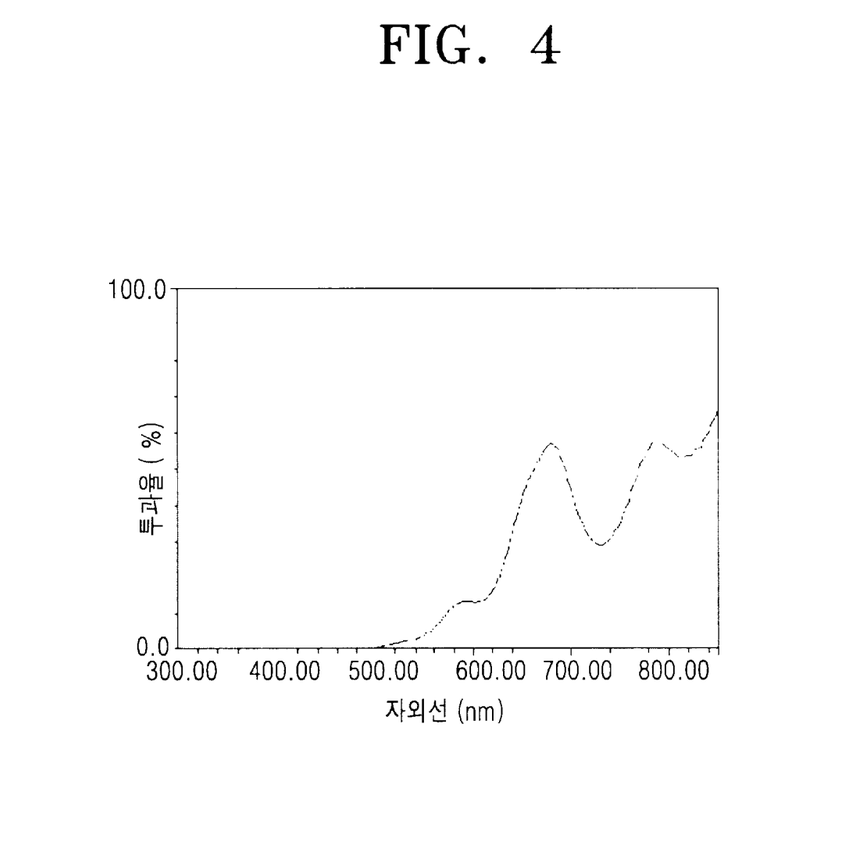
FIG. 4 is a graph of transmissivity of amorphous silicon with respect to ultraviolet rays used during an amorphous development process.

Subsequently, as shown in FIG. 3I, carbon nanotube paste 36 is deposited on the entire surface of the resultant structure using screen printing. Next, ultraviolet rays 37 are radiated at the back of the transparent substrate 31, thereby forming a carbon nanotube field emitter through a development process, as shown in FIG. 3J. Here, when the ultraviolet rays 37 are radiated at the back of the transparent substrate 31, the amorphous silicon layer 33 is used as a photomask embedded for patterning emitter array. Here, amorphous silicon is widely used for improving uniformity for field emission display. Referring to FIG. 4, amorphous silicon has very low transmissivity with respect to ultraviolet rays used for a development process.

Figure 5:
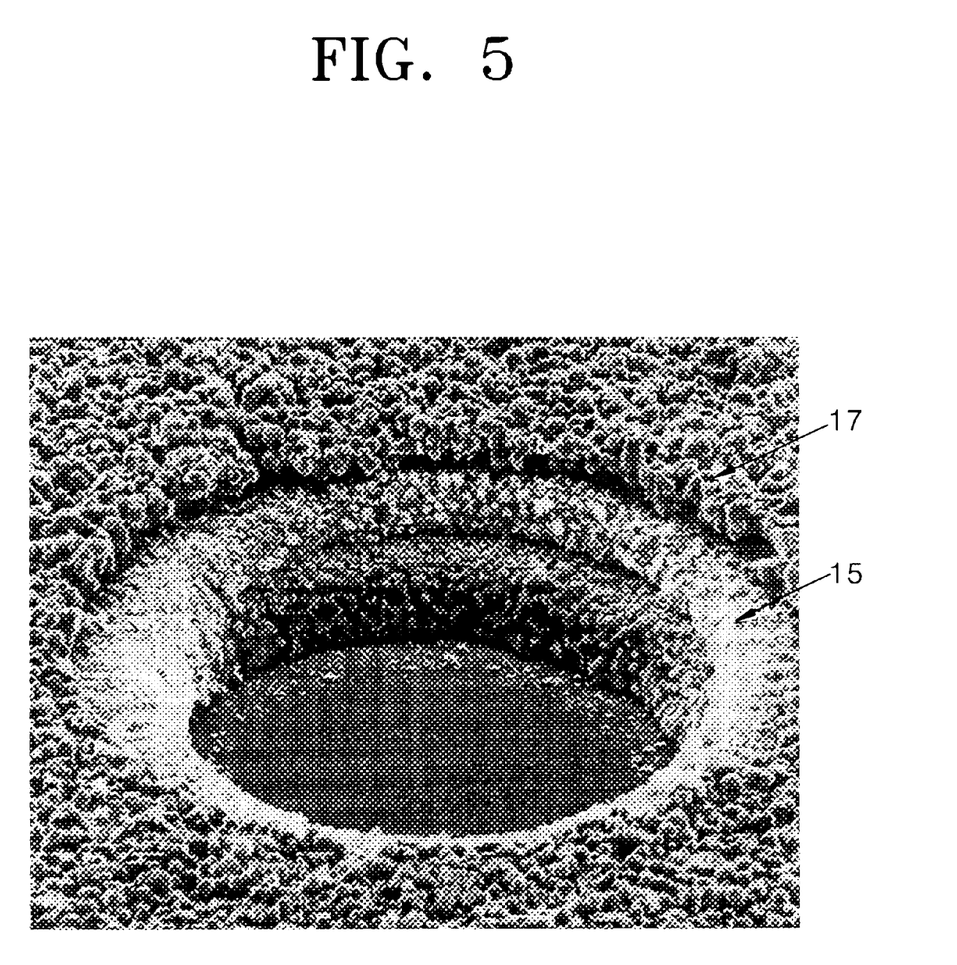
FIG. 5 is an SEM photograph of a triode carbon nanotube field emitter manufactured according to the first embodiment of the present invention.

FIG. 5 is an SEM photograph of a triode carbon nanotube field emitter manufactured according to the present invention. Here, an insulation material and a conductive material are formed of negative photosensitive paste. As shown in the SEM photograph, a multi-layer including an insulation layer 15 and a gate layer 17 is self-aligned without a special aligning process.

Figure 6A:
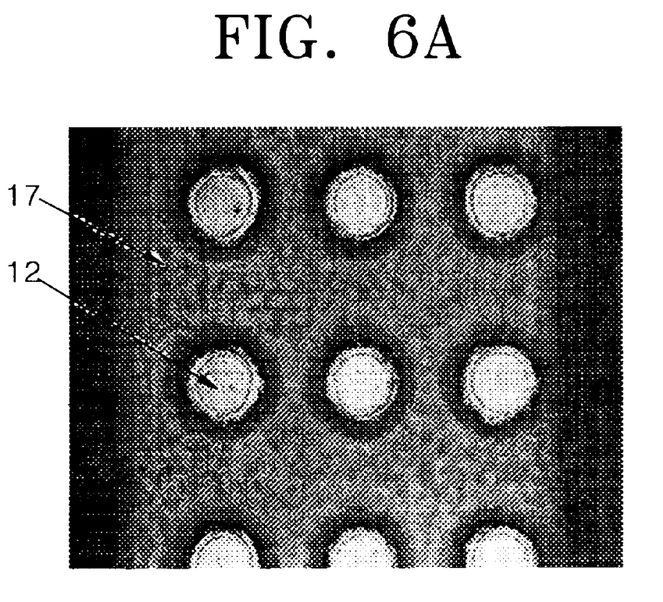
FIGS. 6A and 6B are microscopic photographs of triode carbon nanotube field emitter array in which an insulation material and a conductive material are formed by a negative process and a positive process, respectively.
Figure 6B:
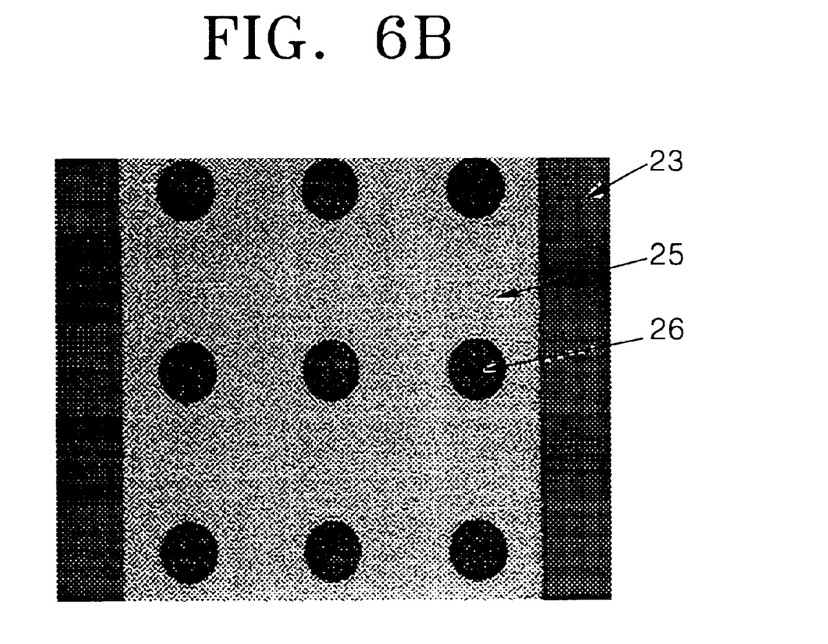

FIGS. 6A and 6B are plan microscope photographs of a triode carbon nanotube field emitter array in which an insulation material and a conductive material are formed of negative photosensitive paste, and a triode carbon nanotube field emitter array in which an insulation material and a conductive material are formed of positive photosensitive paste. In FIG. 6A, negative photosensitive paste is used, and the diameter of a hole is about 60 μm. Although carbon nanotube tips have not been formed yet, the portion of a hole is bright due to an ITO electrode layer 12. In FIG. 6B, positive photosensitive paste is used, and the diameter of a hole is about 40 μm. Here, since carbon nanotube tips 26 are formed within the holes, the holes are dark. As shown in FIG. 6B, a Cr electrode layer 23 is formed on a glass substrate in a striped pattern.

Figure 7A:
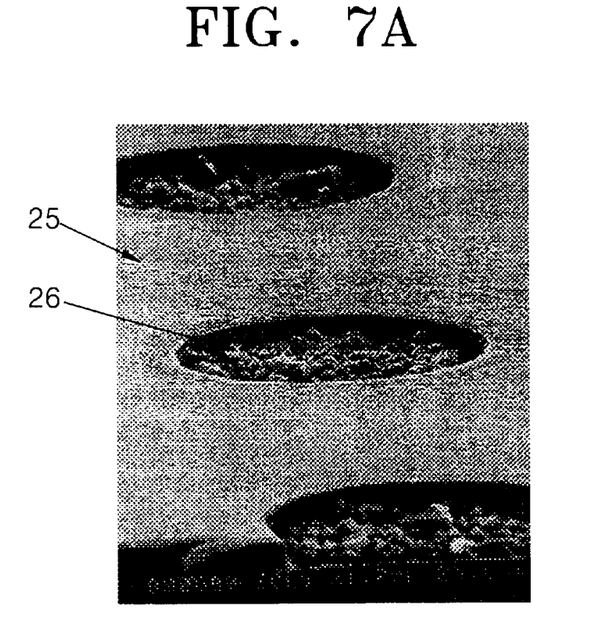
FIGS. 7A and 7B are SEM photographs of a triode carbon nanotube field emitter array manufactured according to the third embodiment of the present invention.
Figure 7B:
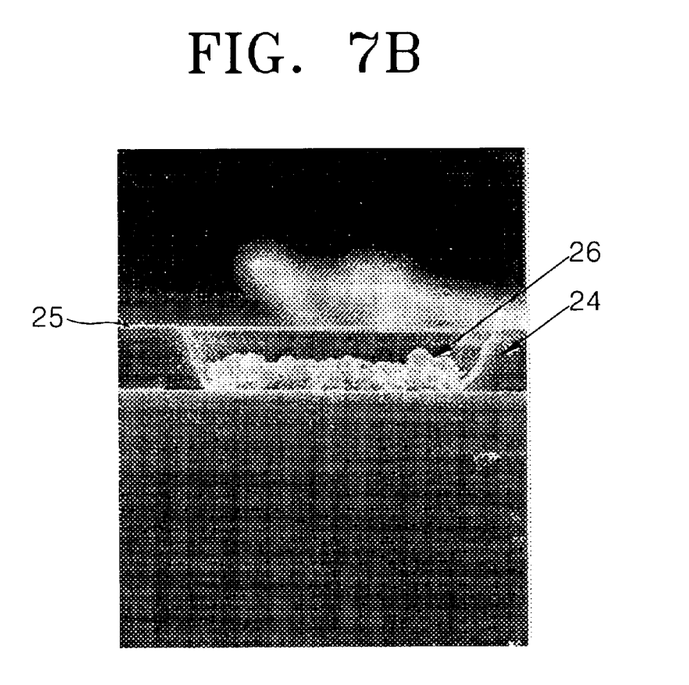

FIGS. 7A and 7B are SEM photographs of a triode carbon nanotube field emitter array according to the present invention, in which an insulation material and a conductive material are formed of positive photosensitive paste. Here, the SEM photograph of FIG. 7A is obtained at an angle of about 30° to the surface of the array and shows that carbon nanotube tips 26 are formed within a hole formed in a gate electrode line pattern 25. Here, the diameter of a hole is about 40 μm. FIG. 7B is a photograph of the section of the array of FIG. 7A and directly shows the carbon nanotubes 26 formed within a hole. It can be seen that an insulation layer formed of polyimide and the gate layer 25 are well aligned.

According to the present invention, when forming a multi-layer by performing a screen printing process and an etching process on negative or positive photosensitive paste, alignment of the multi-layer is well accomplished without using an aligner. In addition, since thin films formed during manufacturing processes are used as mask layers, a triode carbon nanotube field emitter array can be easily manufactured using a small number of mask layers.

What is claimed is:

1. A method of manufacturing a triode carbon nanotube field emitter array comprising the steps of:
   (a) forming a conductive thin film layer on the top of a transparent substrate having a transparent electrode and exposing a predetermined portion of the transparent electrode;
   (b) forming an opaque thin film layer on the exposed predetermined portion of the transparent electrode;
   (c) depositing an insulation material on the entire top surface of the transparent substrate and removing the insulation material from the top surfaces of the conductive thin film layer and the opaque thin film layer, thereby forming an insulation layer;
   (d) forming a gate layer on the top of the insulation layer; and
   (e) removing the opaque thin film layer and forming carbon nanotube tips on the top of the exposed transparent electrode.

2. The method of claim 1, wherein the step (a) comprises the sub steps of:
   patterning a transparent electrode layer on the transparent substrate, thereby forming the transparent electrode in a striped pattern;
   forming the conductive thin film layer on the top of the patterned transparent electrode; and
   forming a hole at a predetermined portion of the conductive thin film layer, thereby exposing the transparent electrode.

3. The method of claim 1, wherein the step (a) comprises the sub steps of:
   forming the conductive thin film layer on the top of the transparent substrate having a transparent electrode layer;
   patterning the conductive thin film layer and the transparent electrode layer simultaneously in a striped pattern; and
   forming a hole at a predetermined portion of the conductive thin film layer, thereby exposing the transparent electrode layer.

4. The method of claim 1, wherein the step (c) is accomplished by performing reverse exposure processing on the transparent substrate after depositing the insulation material on the entire top surface of the transparent substrate.

5. The method of claim 4, wherein the step (c) forms the insulation layer by performing a cycle two times, the cycle comprising the steps of:

depositing the insulation material on the entire top surface of the transparent substrate using a printing process and drying the resulting structure;

removing the insulation material from the top of the conductive thin film layer and the top of the opaque thin film layer using reverse exposure and development processes; and firing the remaining insulation material.

6. The method of claim 1, wherein the step (d) comprises the sub steps of:

forming an opaque insulation layer on the center portion of the insulation layer using a cathode gate patterned screen mask;

depositing conductive photosensitive paste on the entire top surface of the transparent substrate; and performing a reverse exposure process on the transparent substrate, thereby forming the gate layer.

7. The method of claim 1, wherein the step (e) comprises the sub steps of:

depositing negative photosensitive carbon nanotube paste on the entire top surface of the transparent substrate; and performing a reverse exposure on the transparent substrate, thereby forming the carbon nanotube tips only on the top of the transparent electrode.

8. The method of claim 1, wherein the conductive thin film layer comprises Cr, and the opaque thin film layer comprises Al.

9. The method of claim 1, wherein the insulation layer and the gate layer are formed of negative photosensitive paste.

10. A method of manufacturing a triode carbon nanotube field emitter array comprising the steps of:

(a) forming a conductive thin film layer on the top of a transparent substrate having a transparent electrode and exposing a predetermined portion of the transparent electrode;

(b) depositing an insulation material on the top of the transparent substrate;

(c) forming and patterning a gate layer on the top of the insulation material, thereby exposing the insulation material on the top of the transparent electrode;

(d) removing the insulation material from the top of the transparent electrode, thereby forming an insulation layer and exposing the conductive thin film layer and a predetermined portion of the transparent electrode; and (e) forming carbon nanotube tips on the top of the exposed transparent electrode.

11. The method of claim 10, wherein the step (a) comprises the sub steps of:

patterning a transparent electrode layer on the transparent substrate, thereby forming the transparent electrode in a striped pattern;

forming the conductive thin film layer on the top of the patterned transparent electrode; and forming a hole at a predetermined portion of the conductive thin film layer, thereby exposing the transparent electrode.

12. The method of claim 10, wherein the step (a) comprises the sub steps of:

forming the conductive thin film layer on the top of the transparent substrate having a transparent electrode layer;

patterning the conductive thin film layer and the transparent electrode layer simultaneously in a striped pattern; and forming a hole at a predetermined portion of the conductive thin film layer, thereby exposing the transparent electrode layer.

13. The method of claim 10, wherein the step (c) comprises the sub steps of:

depositing a conductive material on the top of the insulation material using thin film equipment; and patterning the conductive material at a location corresponding to the transparent electrode in a hole pattern, thereby exposing the insulation material and forming the gate layer.

14. The method of claim 10, wherein the step (d) is accomplished by performing a dry etching process on the top of the transparent substrate.

15. The method of claim 10, wherein the step (e) comprises the sub steps of:

depositing negative photosensitive carbon nanotube paste on the entire top surface of the transparent substrate; and performing a reverse exposure on the transparent substrate, thereby forming the carbon nanotube tips only on the top of the transparent electrode.

16. The method of claim 10, further comprising the step of performing a PR process on the conductive material of the gate layer, thereby forming a line-shaped gate layer.

17. The method of claim 10, wherein the conductive thin film layer comprises Cr, and the insulation material comprises polyimide.

18. The method of claim 10, wherein the insulation layer and the gate layer are formed of positive photosensitive paste.

19. A method of manufacturing a triode carbon nanotube field emitter array comprising the steps of:

(a) sequentially forming an amorphous silicon layer and an insulation layer on a transparent substrate on which a transparent electrode is formed;

(b) forming a conductive gate layer on the surface of the insulation layer and forming a hole in the gate layer and the insulation layer such that the amorphous silicon layer is exposed;

(c) forming a hole in the exposed amorphous silicon layer, thereby exposing the transparent electrode, and depositing carbon nanotube paste on the entire surface of the transparent substrate having the gate layer and the hole; and (d) performing a development process by radiating ultraviolet rays at a back of the transparent substrate.

20. The method of claim 19, wherein the step (b) comprises:

forming a hole in the gate layer using photolithography, thereby exposing the insulation layer; and putting the resultant structure in an oxide etchant, thereby forming a hole in the oxide layer such that the amorphous silicon layer is exposed.

21. The method of claim 19, wherein the step (c) comprises:

performing dry-etching or wet-etching on the amorphous silicon layer, thereby forming a hole exposing the transparent electrode;

line-patterning the gate layer using photolithography; and depositing carbon nanotube paste on the entire surface of the transparent substrate having the gate layer and the hole using screen printing.

* * * * *